Figure 1:
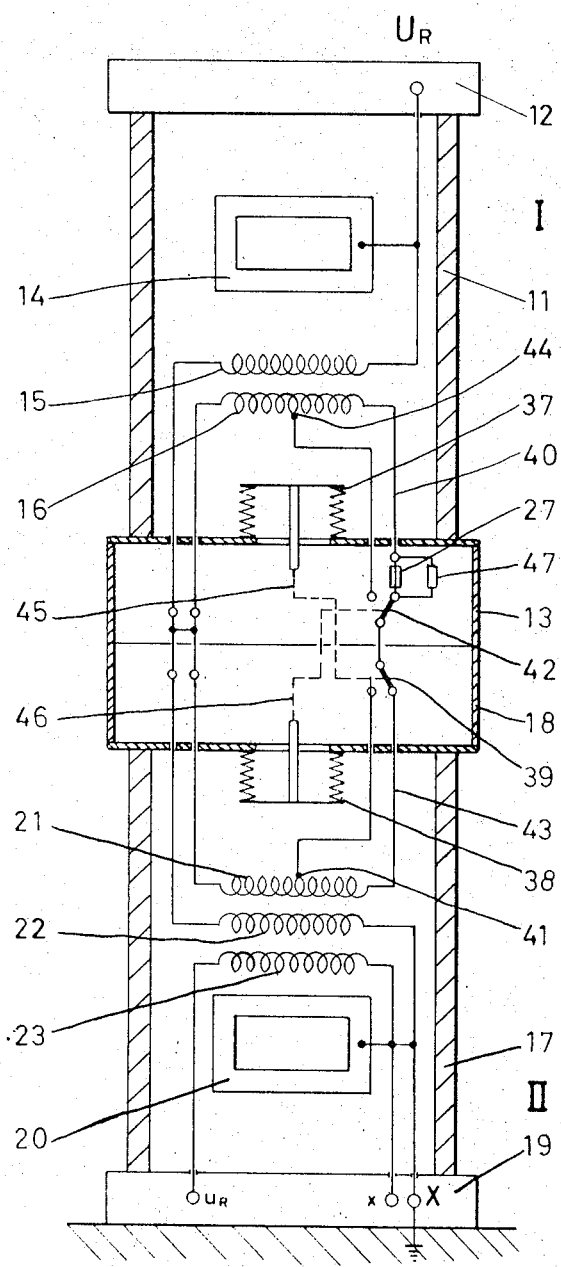
Figure 2:
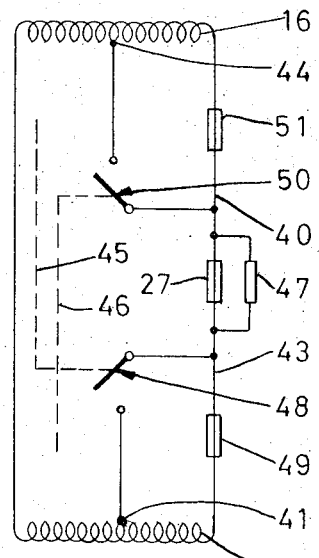

Jan. 30, 1968  D. KIND ET AL  3,366,839
PROTECTIVE DEVICE FOR GAS- OR FLUID-INSULATED CASCADE TRANSFORMERS
Filed Oct. 14, 1965

INVENTORS
Dieter Kind &
Claus Petersen
BY
*Otto John Munz*
ATTORNEY 3,366,839
PROTECTIVE DEVICE FOR GAS- OR FLUID-
INSULATED CASCADE TRANSFORMERS
Dieter Kind, Braunschweig, and Claus Petersen, Bamberg, Germany, assignors to Messwandler-Bau G.m.b.H.
Filed Oct. 14, 1965, Ser. No. 495,966
Claims priority, application Germany, Dec. 31, 1964, M 63,668
6 Claims. (Cl. 317—15)

This invention relates to cascade transformers, and more particularly, to protective devices for the same.

A copending application, Ser. No. 493,831, filed Oct. 7, 1965, discloses a protective device for a gas- or fluid-insulated cascade transformer consisting of two or more sections which are completely closed off or separated from one another from the point of view of gas or fluid. These sections are provided with tight coupling windings and electrically connectible with one another in the manner of a cascade circuit. According to the above-mentioned application, each cascade section is provided with a pressure monitor responding to undue pressure variations, particularly pressure increases, in its interior; this monitor, when responding, interrupts the connection of the tight coupling winding of the respective cascade section with the tight coupling winding of the adjacent cascade section. This protective device in endowed with the great advantage that it makes possible an error indication on the secondary of the cascade transformer without the difficulties which are known to occur in the control of an indicating device which is at ground potential by a monitoring device at a high voltage potential. If, as is normally the case, three cascade transformers are involved pertaining to a symmetric three-phase system, an interruption of the circuit of the tight coupling windings of one of the three transformers can be particularly simply determined in accordance with the above-mentioned application by assigning to each of the three transformers an auxiliary winding which is either provided beside the secondary winding of the cascade transformer, or is the secondary winding of an auxiliary transformer whose primary winding is supplied with power by the secondary winding of the cascade transformer, and by connecting a device for error indication and/or for emitting a switching signal to these three auxiliary windings which are connected in the manner of an open delta.

It is an object of the present invention to provide a further development and improvement of such a protective device.

According to the invention, when a pressure monitor responds and controls a pressure monitor switch, the transformation ratio of the two tight coupling coils with respect to each other is varied and causes a definite readily detectable voltage variation to occur at the secondary of the cascade transformer. Since a definite voltage variation is present, the device can be triggered in a safer and simpler manner to indicate the error and/or to emit a switching signal, than is the case with the less definite voltage variation provided by the protective device of the above-mentioned application. If the above-mentioned open-delta connection according to the above-mentioned application is used for determining the error, this circuit thus yields in the arrangement according to the present invention a definite error voltage for triggering the error-indicating device, this being independent of the cascade section in which the pressure monitor responded and independent of the load condition of the cascade transformer.

In order to effectuate the aforementioned change in transformation ratio, one of the two connection lines leading from the tight coupling coil of the monitored cascade section is connected to a tap provided on the tight coupling coil of the adjacent cascade section upon actuation of a pressure monitor switch; and the portion of the connection line leading to the end of this tight coupling coil is interrupted either by a safety fuse (or an excess-current switch) inserted in this portion of the line, or by the pressure monitor switch itself, this switch being constructed in such a case as a change-over switch.

A further advantage of the invention resides in that the voltage across the endangered cascade section is lowered simultaneously with actuation of the pressure monitor switch, because the voltage distribution in the cascade sections becomes unbalanced due to the change in the transformation ratio of the two tight coupling coils. If, for example, in the case of a two-section transformer, the taps are provided in the centers of the tight coupling coils, and a pressure monitor responds, as a consequence of the switch-over in the tight coupling circuit and the change in the transformation ratios of the tight coupling coils with respect to each other (2:1 or 1:2) caused by the switch-over, the sound cascade section will take over ⅔ of the applied voltage, but the endangered section will take over only half the amount, i.e., ⅓ of the applied voltage.

Another advantage to be mentioned in connection with the protective device of the present invention is that the occurrence of sawtooth oscillations is avoided. Such oscillations ordinarily tend to occur in cascade transformers, particularly those which operate with a high induction of the iron cores, when the tight coupling circuit is opened, and could lead to an undue increase in the voltage load of the cascade sections.

The foregoing and other objects, advantages, and features of the invention and the manner in which the same are accomplished will become more readily apparent upon consideration of the following detailed description of the invention taken in conjunction with the accompanying drawings which illustrate preferred and exemplary embodiments and wherein:

FIGURE I is a schematic diagram illustrating a first embodiment of the invention; and FIGURE II is a schematic diagram illustrating a portion of a second embodiment of the invention.

Turning to FIGURE I, it will be seen that the cascade transformer consists, for example, of two sections I and II entirely closed off from each other from a fluid viewpoint; these sections can be transported separately from each other and are placed on top of each other at the construction site and connected with each other mechanically as well as electrically in the manner of a cascade circuit. In the housing of the upper cascade section I, consisting of an insulated jacket 11 (for example a porcelain frame) with a metallic head 12 and a metallic base 13 and being filled with insulating fluid, there is provided the iron core 14 with the high voltage coil 15 and the tight coupling winding 16. The housing of the cascade section II, likewise consisting of an insulating jacket 17 with a head 18 and a base 19, contains the iron core 20 with the tight coupling winding 21, the high voltage coil 22, and the secondary winding 23 to whose terminals $u_R$ and $x$ there is connected the transformer load which is not shown herein. Numeral 37 denotes the pressure monitor provided at the base 13 of the cascade section I, and numeral 38 denotes the pressure monitor of section II provided at the head 18 thereof. The pressure monitors comprise, in a conventional manner, for example a diaphragm or siphon body inserted in a gas- or fluid-tight manner. Upon an undue increase in pressure in section I, the pressure monitor 37 switches the change-over switch 39 controlled thereby from the operating position shown in the drawing to its other switching position so that the line 40 coming from the tight coupling winding 16 of the cascade section I is switched to the center tap 41 to provided at the tight coupling winding 21 of the cascade section II. Thereby, as described above, the voltage on endangered section I is lowered; and an error indicating device on the secondary of the transformer is coupled, this device not being shown in the drawing, but being preferably constructed and connected in the manner described with reference to the embodiment shown in the above-mentioned application. In the case of an undue pressure increase in cascade section II, the pressure monitor 38 switches the change-over switch 42 controlled by this monitor from the illustrated operative position into its other switching position so that the line 43 coming from the tight coupling winding 21 of section II is switched to the center tap 44 provided at the tight coupling winding 16 of section I. Thereby, the endangered section II is relieved of voltage load, and the error indicating device on the secondary of the transformer is triggered. The just-mentioned type of control of the change-over switches 39, 42 by the pressure monitors 37, 38 is symbolically shown in the drawing by the dashed lines 45, 46.

It is advantageous to have the error indicating device, upon being triggered, emit not only an indicating signal, but also a control signal for disconnecting the transformer or the transformer series. If only an indicating signal is given, the error indicating device is suitably constructed in such a manner that the error indicating emitted thereby cannot be cancelled, independently of the condition of the circuit controlling the device, but is maintained until the cascade transformer series has been switched off. This safety measure is provided because otherwise, if after one pressure monitor has responded, the other pressure monitor should also respond—a case which actually would hardly ever occur—the error indication would be eliminated, for in such a case both change-over switches 39 and 42 would be positioned on the two center taps 41 and 44, and the transformation ratio of the tight coupling windings with respect to each other would again be 1:1, as during normal operation. The error indicating device would thus not emit any indication, although there actually was a defect.

However, it is possible to avoid this difficulty. If the taps provided at the tight coupling windings of adjacent cascade sections are positioned at different points of the tight coupling windings, the transformation ratio of the two tight coupling windings with respect to each other will vary in a different manner, depending upon whether the pressure monitor of one cascade section responds, the pressure monitor of the adjacent cascade section responds, or both pressure monitors respond.

If, as has been described in the above-mentioned application, means responding to an excess current occurring in the circuit of the two tight couplings 16 and 21, such as, for example, a device triggered by excess current or a safety fuse 27, are provided in the connection between these windings, an ohmic resistor 47 is provided as shown in the drawing in parallel to these means (i.e. for example, in parallel to the safety fuse 27), so that, when these means respond, the circuit of the tight coupling windings is strongly damped. This condition, caused by the response of the fuse 27, can be detected in the secondary of the transformer, for example, in the same manner as the response of one of the pressure monitors. The ohmic resistor 47 prevents the occurrence of sawtooth oscillations which might occur under certain circumstances upon the opening of the tight coupling circuit, and the resistance value of the resistor is selected for this purpose. The arrangement of this resistor in the circuit thus makes it possible that an error indication can be transmitted to the secondary of the transformer upon the occurrence of a corresponding defect, without the occurrence of dangerous sawtooth oscillations.

The primary windings of the three auxiliary transformers whose secondary windings (designated by 33, 34, 35 in the above-mentioned application) supply, in the form of an open delta circuit, the error indicating device with power, can also be connected to special secondary windings of the three cascade transformers, these windings being provided beside the secondary windings supplying the transformer load with power.

FIGURE II shows a second embodiment of a protective device according to the invention employing pressure monitors which, when responding, only close a switch. (For the sake of simplicity, only the circuit of the tight coupling windings 16, 21 is shown in FIGURE II.) When the pressure monitor of the upper cascade section I (37 in FIGURE II) responds, it closes the switch 48 via the control linkage 45, the switch connecting the connection line 40, 43 of the two tight coupling windings to the center tap 41 of the tight coupling winding 21. By virtue of this connection, half of this winding is short-circuited; and a fuse 49, inserted in the line portion 43, responds and interrupts this short circuit. Thus, the same condition is reached as in the embodiment illustrated in FIGURE I after the change-over switch 39 has been changed. In like manner, when the pressure monitor of the cascade section II (38 in FIGURE I) responds, it closes the switch 50 via the control linkage 46, this switch connecting the connection line 40, 43 to the center tap 44 of the tight coupling winding 16 of the cascade section I. Half of this winding is thereby short-circuited; and a fuse 51 inserted in the line portion 40, responds and interrupts this short circuit. The effect is again the same as in FIGURE II when the switch 42 has been reversed. As in the example illustrated in FIGURE I, it is also suitable in this case to insert the fuse 27 with the parallel resistor 47 in the connection line 40, 43. The fuses 49 and 51 are dimensioned such that they are not triggered by the excess currents occurring in the tight coupling circuit, to which the fuse 27 responds, but that they respond to the short-circuit currents occurring upon closing of the switches 48 and 49, respectively.

While preferred embodiments of the invention have been shown and described, it will be apparent to those skilled in the art that changes can be made without departing from the principles and spirit of the invention, the scope of which is defined in the appended claims. Accordingly, the foregoing embodiments are to be considered illustrative rather than restrictive of the invention and those modifications which come within the meaning and range of equivalency are to be included therein.

What is claimed is:

1. A protective device for a gas- or fluid-insulated cascade transformer comprising a plurality of stacked sections which are completely closed off or separated from one another from a gas or fluid point of view, these sections being provided with tight coupling windings and being connected electrically in the manner of a cascade circuit with a tight coupling winding of one section being connected to a tight coupling winding of an adjacent section; said device being characterized in that each of said sections is provided with a pressure monitor responding to undue variations in pressure in its interior, said pressure monitor, when responding, interrupting the connection of the tight coupling winding of the corresponding cascade section with the tight coupling winding of the adjacent cascade section and connecting one of the two connection lines coming from the tight coupling winding of the corresponding cascade section to a tap provided at the tight coupling winding of the adjacent cascade section by means of a switch controlled by the monitor, and in that the portion of the connection line leading to an end of the tight coupling winding of the adjacent section includes means to interrupt said portion in response to actuation of said switch by said monitor.

2. A protective device according to claim 1, characterized in that said means comprises a safety fuse responsive to excess current.

3. A protective device according to claim 1 characterized in that said means comprises said switch, said switch being a change-over switch.

4. A protective device according to claim 1, characterized in that the taps provided at the tight coupling windings of adjacent cascade sections are positioned at differing points of the tight coupling winding so that the transformation ratio of the two tight coupling windings with respect to each other is varied in a different manner, depending upon whether the pressure monitor in one of the cascade sections responds, the pressure monitor of the adjacent cascade section responds, or both pressure monitors respond.

5. A protective device according to claim 1, wherein there are provided in the circuit of the tight coupling windings, in addition to the switches controlled by the pressure monitors, means responsive to an excess current in the circuit of the tight coupling windings, and an ohmic resistor in parallel to said means so that, when the means respond, the circuit of the tight coupling windings is strongly damped.

6. A protective device according to claim 1, characterized in that the device comprises means, independent of the condition of the circuit controlling the device, to maintain an error indication until the cascade transformer series has been disconnected.

References Cited

UNITED STATES PATENTS

| | | | |
|---|---|---|---|
| 1,693,430 | 11/1928 | Austin | 317—15 X |
| 1,991,879 | 2/1935 | Baum | 317—14 X |
| 3,335,323 | 8/1967 | Molin | 317—14 X |

MILTON O. HIRSHFIELD, *Primary Examiner.*

J. D. TRAMMELL, *Assistant Examiner.*